United States Patent

[11] 3,621,170

[72] Inventor Otto Jensen
 Plymouth, British W. Indies
[21] Appl. No. 75,113
[22] Filed Sept. 24, 1970
[45] Patented Nov. 16, 1971
[73] Assignee I-T-E Imperial Corporation
 Philadelphia, Pa.

[54] GAS-FILLED SEPARABLE CONTACTS FOR HIGH-VOLTAGE SWITCHGEAR
 6 Claims, 5 Drawing Figs.

[52] U.S. Cl. ................................................. 200/148 R,
 200/50 AA
[51] Int. Cl. ........................................... H01h 33/54

[50] Field of Search ............................................ 200/148, 50
 AA, 148 G, 148 B

[56] References Cited
UNITED STATES PATENTS
3,278,712  10/1966  Tominaga ..................... 200/148

Primary Examiner—Robert S. Macon
Attorney—Ostrolenk, Faber, Gerb & Soffen

ABSTRACT: A chamber filled with high-pressure SF$_6$ surrounds the disconnect contacts of a circuit breaker when the breaker is connected to the cooperating terminals of a metal-clad switchgear housing to permit a relatively short bushing length.

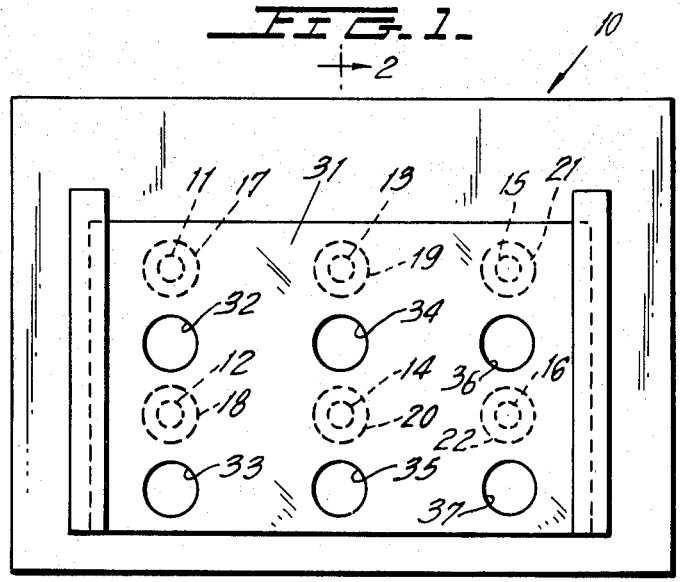
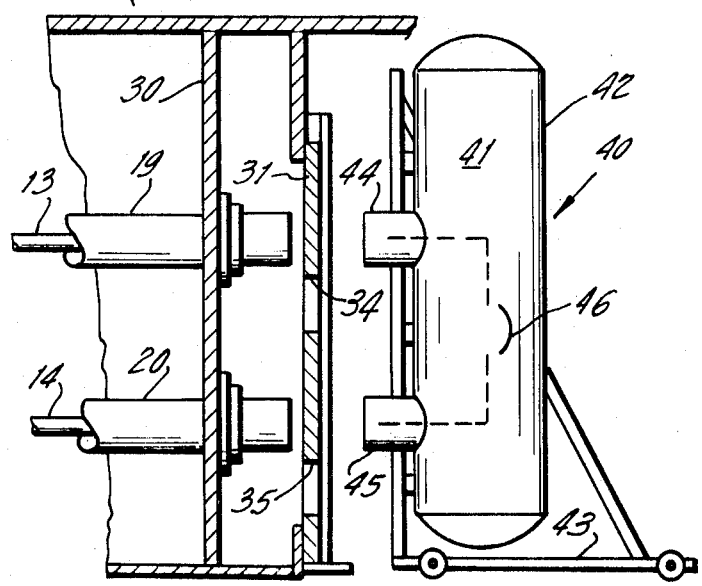

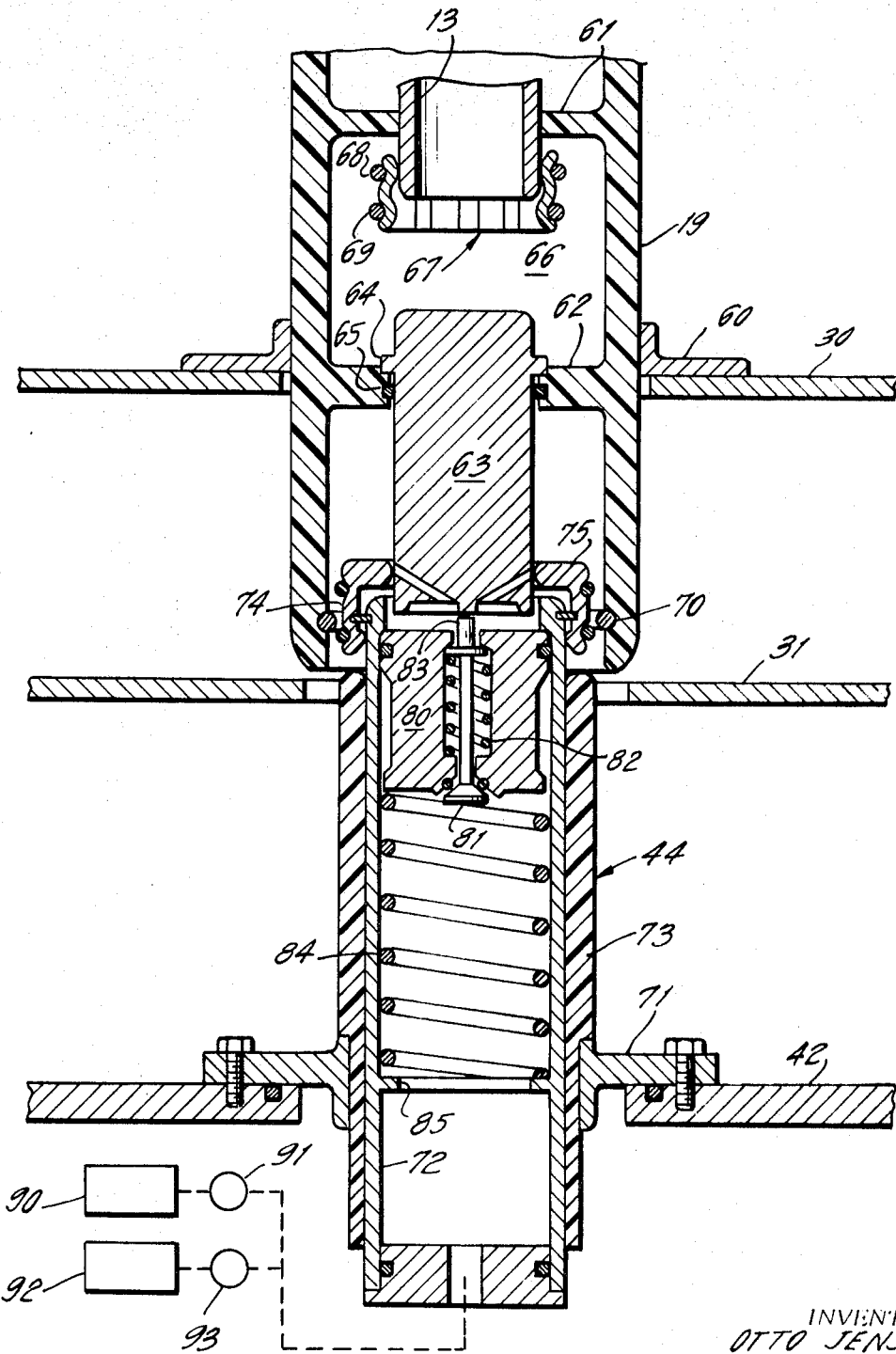

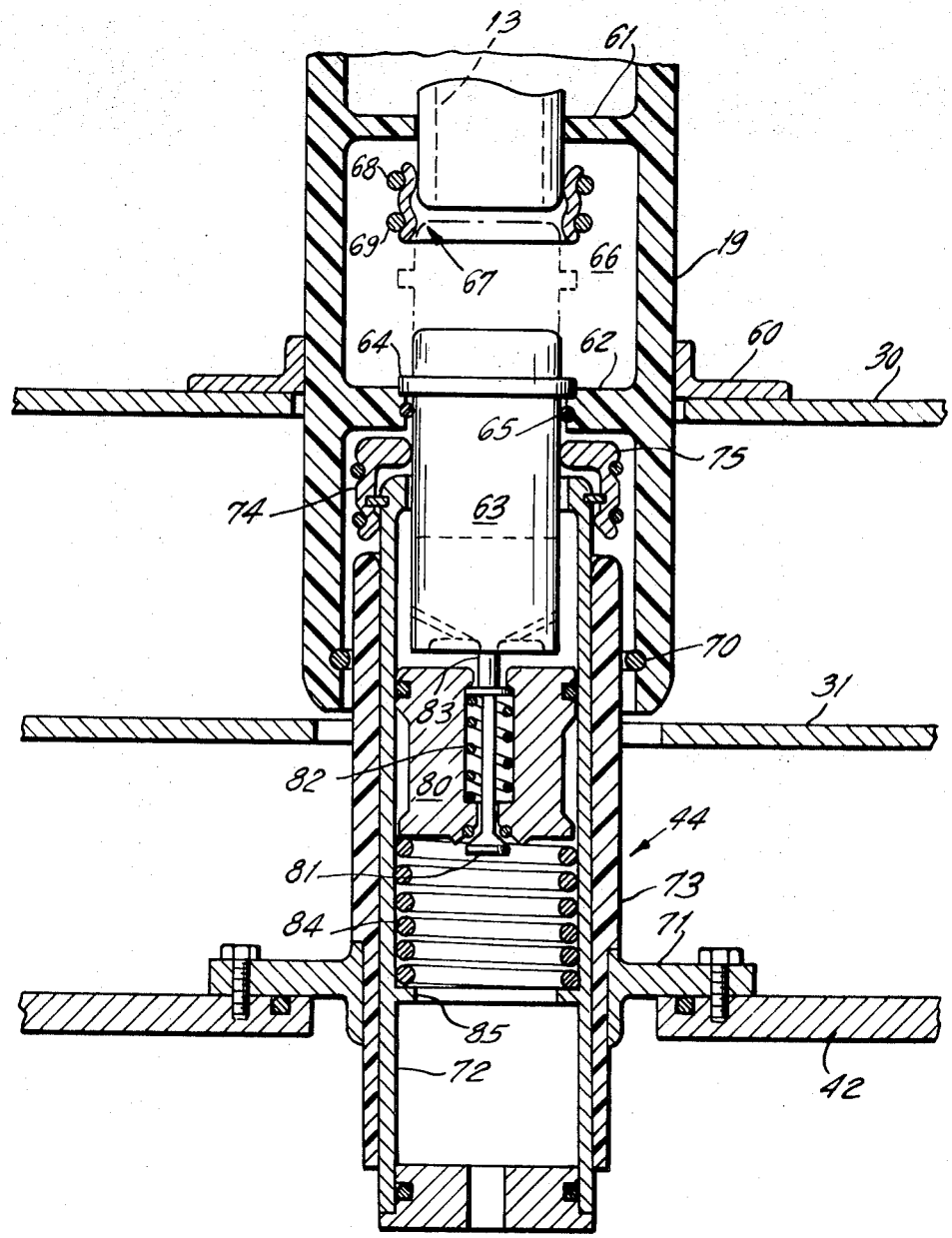

GAS-FILLED SEPARABLE CONTACTS FOR HIGH-VOLTAGE SWITCHGEAR

BACKGROUND OF THE INVENTION

This invention relates to a disconnect contact construction for metal-clad switchgear, and more particularly relates to a novel disconnect contact structure which may be filled with a high-dielectric gas so that the distance from grounded structures to live conducting members can be relatively short.

The present invention permits the practical extension of metal-clad switchgear concepts to voltage classes up to and in excess of 34 kv. Thus, a such voltages, it is useful to use dielectric gas insulated switchgear and circuit breakers. However, the contact bushings for the breaker element becomes excessively long since, when the breaker is connected, a long path is needed through air from the contact to the grounded metallic housing.

In accordance with the present invention, the exposed conductor of the circuit breaker is enclosed in an atmosphere of pressurized dielectric gas when the breaker disconnect contacts move toward engagement with their cooperating stationary contacts in the switchgear cubicle. Thus, the bushing length can be appreciably shorter than if the atmosphere were air. Moreover, the gas volume surrounding the disconnect contacts is relatively small so that very little gas is lost when the disconnect contacts are opened.

BRIEF DESCRIPTION OF THE DRAWINGS

FIG. 1 is an elevation view of the metal enclosure with the disconnect contact shutter closed.

FIG. 2 is a side cross-sectional view of FIG. 1 with the circuit breaker in its disconnected position.

FIG. 3 is a longitudinal cross-sectional view of one of the pairs of disconnect contacts of FIGS. 1 and 2 just after the circuit breaker contact has entered the stationary bushing of the metal enclosure.

FIG. 4 is similar to FIG. 3 and shows the movable disconnect contact in its fully extended but disengaged position.

DETAILED DESCRIPTION OF THE PREFERRED EMBODIMENTS

Figure 5:
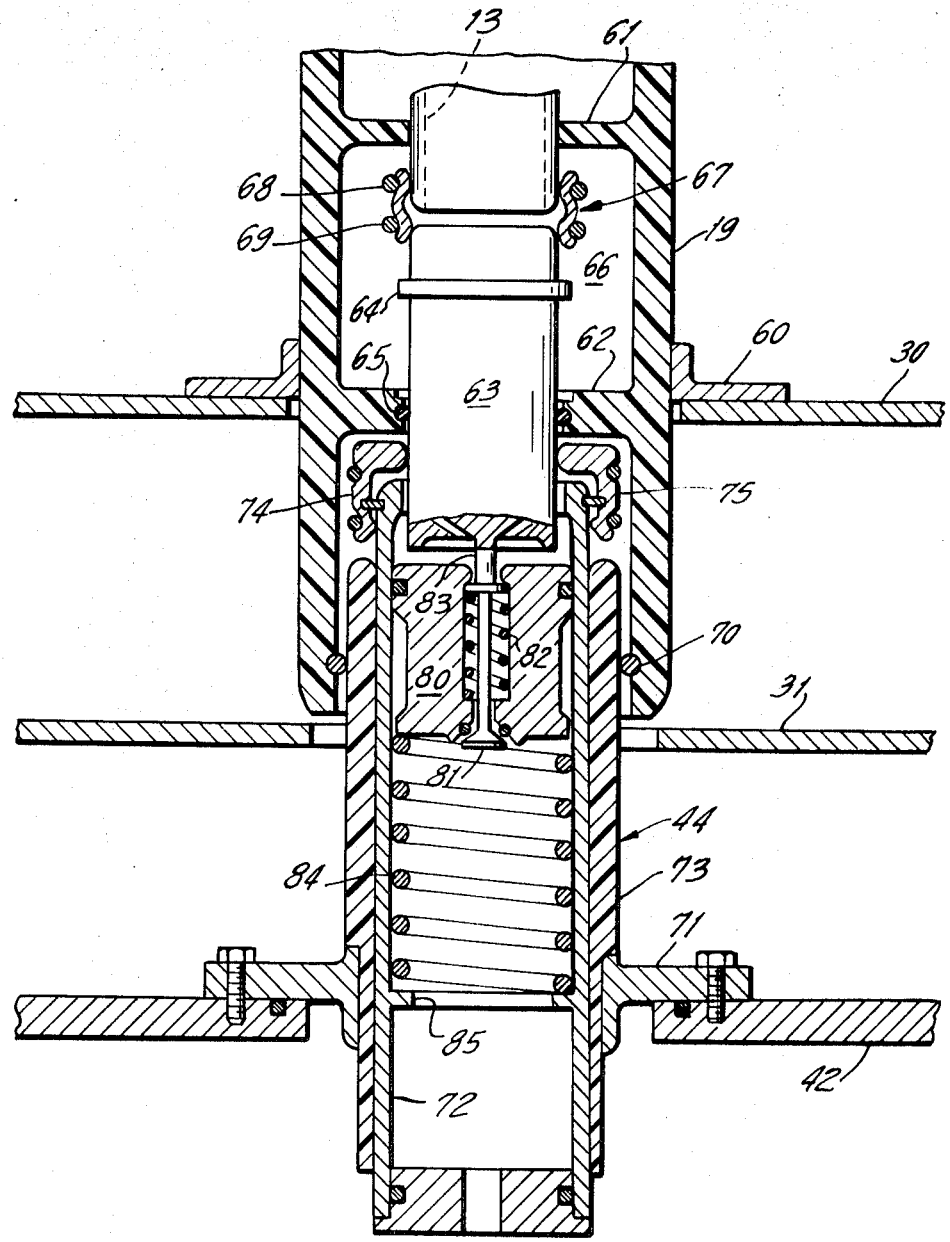
FIG. 5 is a similar to FIG. 4 and shows the disconnect contacts in their engaged position.

Referring first to FIGS. 1 and 2, there is illustrated a conventional metal enclosure 10 which receives a plurality of bus bars schematically shown in FIGS. 1 and 2 as bus bars 11 to 16. Bus bars 11–12, 13–14 and 15–16 are conductors of three respective phases, and are housed and supported within suitable insulation bushings 17 to 22, respectively, for conductors 11 to 16. Each of the bushings such as bushing 19 extend through a wall 30 in housing 10, as shown in FIG. 2, and their open ends are covered by a sliding shutter 31 which has suitable shutter openings 33 to 37. When the shutter is moved upwardly, circuit breaker terminals can be connected to the bus conductors 11 to 16. When, however, such circuit breakers are racked to a disconnected position relative to buses 11 to 16, the grounded shutter 31 is closed to prevent accidental contact with any live conductor elements.

In accordance with the invention, the concept of metal-enclosed switchgear is extended to higher voltage classes, for example, 34 kv. and up, whereby the bus conductors 11 to 16 are elements of a gas-insulated transmission bus system of a type well known to the art. Moreover, and further in accordance with the invention, the circuit interrupters are also of the high-dielectric gas type, shown, for example, in copending application Ser. No. 823,115 (C-1354[ER]), filed May 8, 1969 in the name of Otto Jensen, entitled GAS BLAST CIRCUIT INTERRUPTER USING MAIN MOVABLE CONTACT AS BLAST VALVE, and assigned to the assignee of the present invention. Thus, in FIG. 2, such a circuit interrupter is shown as the interrupter 40 which is a truck-mounted unit having three poles, only the center pole 41 being shown.

Center pole 41 consists of a tank 42, which is suitably supported in a truck frame 43 which can be racked or otherwise moved toward and away from the shutter 31 and bushings 19 and 20. The pole 41 then has terminal bushings 44 and 45, which will be described more fully hereinafter, which are suitably sized to pass through the shutter openings 34 and 45 when the shutter is open to engage the corresponding bushings 19 and 20. When the circuit breaker is moved to its connected position, the circuit breaker contacts, schematically illustrated as contacts 46, will be connected to and in series with conductors 13 and 14. Clearly, two similar circuit breaker poles will be provided for conductors 11 and 12 and for conductors 15 and 16, respectively.

In accordance with the invention, the bushings 44 and 45 and the cooperating bushings and disconnect contact structures at the ends of each of buses 11 to 16 are so arranged that the contacts are surrounded by high-dielectric gas when the contacts are closed, whereby live conductive components are permanently surrounded by high-dielectric gas, to permit relatively short bushing lengths for the circuit breaker bushings 44 and 45 and for the cooperating bus bushings extending beyond wall 30 of FIG. 2. This bushing and contact structure is typically shown for contact 44 in FIGS. 3, 4, and 5 which show the disconnect contacts in various positions.

Components of FIGS. 3, 4 and 5 which are similar to those of FIGS. 1 and 2 have been given similar identifying numerals. Thus, FIGS. 3, 4 and 5 illustrate the bushing 19 as being supported on wall member 30 by a suitable flange 60 which may be bolted (not shown) to wall member 30. Bushing 19, which may be of a suitable insulation epoxy material, is further provided with an inwardly extending web section, such as web 61, which secures conductor 13 in position. The interior of bushing 19 is filled with sulfur hexafluoride under a pressure of, for example, 4 atmospheres. Bushing 19 is then provided with an interior wall 62, which has a central opening therein, which slidably receives a conductive plunger contact 63.

Contact 63 contains a flange stop 64 and receives a gastight gasket fitting 65 which is so constructed that plunger 63 may slide axially while maintaining a gastight fitting within the wall 62, thereby forming a permanent seal to sulfur hexafluoride within cavity 66. The end of contact 13 is then provided with a "tulip clip" type contact 67 fixed thereon and consisting of the usual contact fingers which are pressed inwardly by suitable biasing springs, such as the springs 68 and 69. Note that the upper end of contact 67 is permanently fixed to the end of conductor 13 and serves as the stationary disconnect contact of the system. Clearly, other similar types of disconnect arrangements could be used for providing a disconnectable contact between the upper end of plunger 63 and the end of conductor 13.

The interior surface of bushing 19 is then provided with an internal sliding ring seal 70, which will be seen later to form a gastight sliding connection to the surface of bushing 44 when the circuit breaker is moved to a connected position relative to the bus bars within housing 10. The bushing 44, as described previously, extends from the tank wall 42 of the circuit breaker and is connected to wall 42 by a suitable flange 71. Bushing 44 consists of a conductive cylinder 72 covered with an insulation sheath 73, with the end of conductor 72 being encircled by a plurality of sliding contact fingers which includes contact fingers 74 and 75 which are permanently secured to the upper end of conductor 72 and are pressed inwardly by suitable biasing springs extending around their lateral exterior surfaces. These contacts serve to make sliding contact over the exterior surface of plunger 63, as will be described more fully hereinafter.

The interior of conductor 72 then receive a sliding piston 80 which contains a central relief valve 81 which is biased to a sealed position by compression spring 82. The valve 81 has an extension 83 at its upper surface which can engage the bottom of plunger 63 in order to open the valve 81. A biasing spring 84 is then applied between piston 80 and shoulder 85 to bias piston 80 upwardly.

As is shown schematically in FIG. 3 and since the circuit breaker 40 is of the two-pressure type, as described in copending application Ser. No. 823,115 (C–1354[ER]), sulfur hexafluoride at two pressures will be available and can be appropriately connected to the interior of conductor 72. Thus, a first pressure source 90 can be connected to the interior of conductor 72 by operation of its control valve 91 where pressure source 90 could, for example, be at a pressure of about 3 atmospheres. Alternatively, pressure source 92, which is controlled by valve 93, may be connected to the interior of conductor 72 where the pressure source 92 might be of a pressure of 15 atmospheres.

The operation of the system is as follows:

FIG. 3 shows the location of the components after the grounded metallic shutter 31, which normally blocks the entrance of each terminal entrance port, has been opened and the breaker terminal assembly carrying the flexible contacts 74 and 75 has partly entered the switchboard bushing 19 and contact fingers 74 and 75 are in sliding engagement with plunger 63. The plunger 63 is held in the position shown in FIG. 3 by the pressure in chamber 66 which is sufficiently high to overcome the frictional force on plunger 63 which would tend to move it upwardly. At this time, it will also be noted that the pressure in the interior of conductor 72 is taken from source 90 and will be a lower pressure than the pressure within chamber 66.

As the circuit breaker continues to move toward its connected position, and as shown in FIG. 4, the top of plunger 83 carried in piston 80 engages the bottom of plunger 63 and the valve 81 is opened against the force of spring 82. Note that the sliding fingers 74 and 75 of the contact cluster on the end of conductor 72 continue to move upwardly over the surface of plunger 63. The opening of valve 81 permits the flow of relatively low-pressure gas (3 atmospheres) from the interior of conductor 72 through valve 81, through the center of piston 80 and into the volume surrounding plunger 63 and the contacts, such as contacts 74 and 75, at the end of conductor 72. This gas will then dilute and replace the air previously in this confined space. The continued penetration of the breaker bushing 44 then brings the outer surface of insulation sleeve 73 into sealing engagement with the O-ring seal 70 so that the gas surrounding the metallic components including the end of conductor 72, contacts 74 and 75 and plunger 63 are immersed in a high-dielectric gas. Once the position of FIG. 4 is reached, the circuit breaker is physically in its final position and the disconnect contacts can now safely be closed since all conductive elements are encased in a high-dielectric gas so that the distance between these conductive members and the grounded shutter 31 can be relatively small. Thus, the operator of the circuit breaker can operate valves 91 and 93 (FIG. 3) such that valve 91 is closed and valve 93 opened to apply the higher pressure of source 92 to the interior of conductor 72 and beneath piston 80. Piston 80, under the relatively high pressure of source 92, is then moved upwardly from the position of FIG. 4 to the position of FIG. 5 driving the plunger 63 before it so that plunger 63 engages tulip clip contact 67, thereby closing the disconnect contacts. Note that during this time, the circuit breaker contacts preferably are open so that the disconnect contacts do not close an energized circuit.

As pointed out previously, since the plunger 63 and contacts 74 and 75 are now enclosed in a high-pressure dielectric gas, the length of the bushing portion 19 between the disconnect finger assembly including fingers 74 and 75 and the grounded shutter 31 may be very short. Thus, a conductive switchboard container and grounded metallic shutter can be used to cover the switchboard entrance bushing without fear of flashover even though the potential of conductor 13 to ground may be 34 kv. or higher. Moreover, the high-pressure gas in the bushing assemblies will permit substantial reductions in size for the various bushings. Finally, it will be clear that special gas systems will not be necessary since the novel invention incorporates the gas pressure and gas medium which are normally used by the circuit breaker.

In order to open the disconnect contacts of FIGS. 3, 4 and 5, the circuit breaker poles are first operated. Thereafter, valve 93 is closed and valve 91 opened such that the pressure beneath piston 80 decreases to the lower pressure of source 90. This then causes the plunger 63 to be moved downwardly from the position of FIG. 5 to the position of FIG. 4, thereby to open the disconnect contacts. The valve 91 may then be closed and the breaker is then racked from the position of FIG. 4 to the position of FIG. 3 in order to open the disconnect contacts by causing sliding contacts 74 and 75 to slide off of the end of plunger 63. Note that the only gas which is lost during the opening operation is the small volume of gas which has been trapped beneath wall 62 in FIGS. 3, 4 and 5 and above the ring-shaped seal 70, with this gas being exhausted to the external atmosphere when the outer surface of bushing 44 clears ring 70.

Although this invention has been described with respect to preferred embodiments, it should be understood that many variations and modifications will now be obvious to those skilled in the art and, therefore, the scope of this invention is limited not by the specific disclosure herein, but only by the appended claims.

The embodiments of the invention in which an exclusive privilege or property is claimed are defined as follows:

1. A gas-filled disconnect contact for metal-clad switchgear comprising, in combination;
    a grounded conductive housing;
    a bus conductor within said housing and having a terminal end; and a stationary contact structure on said terminal end of said bus conductor;
    a switchboard bushing of insulation material enclosing said terminal end of said bus conductor; said switchboard bushing comprising a cylinder extending beyond said terminal end of said bus conductor and containing an internal barrier defining a closed pressure chamber filled with gas at a first pressure and surrounding said terminal end of said bus conductor and an open-ended chamber extending beyond said barrier;
    a first sealing means connected to the outer end of said open-ended chamber for receiving cooperating sealing means to seal said open-ended chamber;
    a circuit breaker movable relative to said grounded housing and having a circuit breaker insulation bushing extending therefrom;
    said circuit breaker insulation bushing enclosing a circuit breaker conductor which extends beyond the end of said circuit breaker insulating bushing; and a contact structure on the end of said circuit breaker conductor;
    a second sealing means connected with said circuit breaker bushing for engaging said first sealing means, thereby to seal said open-ended chamber when said circuit breaker is moved to a connected position relative to said grounded conductive housing;
    and an intermediate sliding contact slidably mounted within said internal barrier for slidably engaging said contact on said circuit breaker conductor when said circuit breaker is moved to its said connected position;
    operating means for moving said intermediate sliding contact into engagement with said stationary contact structure of said bus conductor while maintaining contact with said circuit breaker conductor;
    and means for filling said open-ended chamber with a high-dielectric gas after said circuit breaker is moved to its said connected position and said open-ended chamber is sealed, whereby all conductive components within said open-ended chamber are insulated from adjacent portions of said grounded conductive housing by said gas.

2. The device of claim 1 wherein said grounded conductive housing includes a metallic shutter movable between an obscuring and an open position relative to said open-ended chamber.

3. The device of claim 1 wherein said operating means for moving said sliding contact includes a piston mounted for movement within said circuit breaker bushing and which is connected to said sliding contact; and pressure means for controllably applying pressure to said piston for moving said sliding contact.

4. The device of claim 1 wherein said sliding contact comprises a conductive plunger having stop means thereon disposed within said closed pressure chamber; said plunger being normally biased away from said stationary contact structure by the gas pressure within said closed pressure chamber.

5. The device of claim 4 wherein said operating means for moving said sliding contact includes a piston mounted for movement within said circuit breaker bushing and which is connected to said sliding contact; and pressure means for controllably applying pressure to said piston for moving said sliding contact.

6. The device of claim 5 wherein said piston includes a valve therein for venting pressure from the interior of said circuit breaker bushing to the end of said plunger adjacent said piston and means for varying the pressure within said circuit breaker bushing between a second and third pressure which causes forces on said plunger which are respectively greater than and less than the opposing force on said plunger due to the gas pressure in said closed pressure chamber.

* * * * *